US008918856B2

(12) United States Patent
Tor et al.

(10) Patent No.: US 8,918,856 B2
(45) Date of Patent: Dec. 23, 2014

(54) TRUSTED INTERMEDIARY FOR NETWORK LAYER CLAIMS-ENABLED ACCESS CONTROL

(75) Inventors: Yair Tor, Shorashim (IL); Eugene (John) Neystadt, Kfar-Saba (IL); Patrik Schnell, Issaquah, WA (US); Oleg Ananiev, Migdal Haemeq (IL); Arthur Zavalkovsky, Netanya (IL); Daniel Rose, Modiin (IL)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 12/822,745

(22) Filed: Jun. 24, 2010

(65) Prior Publication Data
US 2011/0321152 A1    Dec. 29, 2011

(51) Int. Cl.
*G06F 21/00* (2013.01)
*H04L 29/06* (2006.01)

(52) U.S. Cl.
CPC ............ H04L 63/102 (2013.01); H04L 63/164 (2013.01)
USPC .......................................................... 726/12

(58) Field of Classification Search
USPC ........ 726/2, 11, 1, 5, 7, 9; 709/217, 218, 219, 709/150, 182; 713/168, 151
See application file for complete search history.

(56) References Cited

U.S. PATENT DOCUMENTS

| | | |
|---|---|---|
| 5,694,601 A | 12/1997 | White |
| 5,968,176 A | 10/1999 | Nessett et al. |
| 6,279,111 B1 | 8/2001 | Jensenworth et al. |
| 6,321,338 B1 | 11/2001 | Porras et al. |
| 6,873,988 B2 | 3/2005 | Herrmann et al. |
| 6,947,979 B1* | 9/2005 | Pon ................................ 709/223 |
| 6,986,061 B1* | 1/2006 | Kunzinger ..................... 713/153 |
| 7,099,338 B1* | 8/2006 | Lee ............................... 370/401 |
| 7,114,174 B1 | 9/2006 | Brooks et al. |
| 7,200,530 B2 | 4/2007 | Brown et al. |
| 7,327,686 B2* | 2/2008 | Standridge .................... 370/241 |
| 7,587,588 B2 | 9/2009 | Clemmons, II et al. |
| 7,594,256 B2* | 9/2009 | Bhat et al. ......................... 726/1 |
| 7,680,819 B1 | 3/2010 | Mellmer et al. |
| 7,698,566 B1 | 4/2010 | Stone |

(Continued)

OTHER PUBLICATIONS

Unified Access Control Solution v2.0: Infranet Controller, UAC Agent and UAC: http://www.netutils.com/documentation/JuniperUAC/Datasheet/Infranet_Controllers.pdf Published: Nov. 2006, 5 pages.

(Continued)

*Primary Examiner* — Minh Dinh
*Assistant Examiner* — Devin Almeida
(74) *Attorney, Agent, or Firm* — Henry Gabryjelski; Kate Drakos; Micky Minhas

(57) ABSTRACT

Embodiments of the invention provide a trusted intermediary for use in a system in which access control decisions may be based at least in part on information provided in claims. The intermediary may request claims on behalf of a network resource to which access is requested, and submit the claims for a decision whether to grant or deny access. The decision may be based at least in part on one or more access control policies, which may be pre-set or dynamically generated. Because the intermediary requests the claims and submits the claims for an access control decision, the network resource (e.g., a server application) need not be configured to process claims information.

17 Claims, 5 Drawing Sheets

(56) References Cited

U.S. PATENT DOCUMENTS

| | | | |
|---|---|---|---|
| 7,710,886 B2* | 5/2010 | Standridge | 370/241 |
| 7,774,825 B2 | 8/2010 | Walls | |
| 7,792,920 B2 | 9/2010 | Istvan et al. | |
| 7,809,807 B2 | 10/2010 | Tominaga | |
| 8,054,494 B2 | 11/2011 | Takahashi et al. | |
| 8,185,945 B1* | 5/2012 | Eatough et al. | 726/14 |
| 8,244,886 B2 | 8/2012 | Short et al. | |
| 8,312,079 B2 | 11/2012 | Newsome et al. | |
| 2002/0069278 A1 | 6/2002 | Forslow | |
| 2002/0138643 A1 | 9/2002 | Shin et al. | |
| 2002/0198939 A1* | 12/2002 | Lee et al. | 709/203 |
| 2003/0033368 A1 | 2/2003 | Tominaga | |
| 2003/0046587 A1 | 3/2003 | Bheemarasetti et al. | |
| 2003/0065942 A1 | 4/2003 | Lineman et al. | |
| 2003/0217132 A1* | 11/2003 | Batten et al. | 709/223 |
| 2005/0120160 A1 | 6/2005 | Plouffe et al. | |
| 2006/0224741 A1 | 10/2006 | Jackson | |
| 2007/0033643 A1 | 2/2007 | Rossi | |
| 2007/0106986 A1 | 5/2007 | Worley, Jr. | |
| 2007/0112574 A1 | 5/2007 | Greene | |
| 2007/0150934 A1 | 6/2007 | Fiszman | |
| 2007/0174917 A1 | 7/2007 | Guruswamy | |
| 2007/0195779 A1 | 8/2007 | Judge et al. | |
| 2007/0245409 A1 | 10/2007 | Harris et al. | |
| 2007/0266433 A1 | 11/2007 | Moore | |
| 2008/0002696 A1 | 1/2008 | Claessens et al. | |
| 2008/0114624 A1* | 5/2008 | Kitts | 705/7 |
| 2008/0148341 A1 | 6/2008 | Ferguson et al. | |
| 2008/0301784 A1 | 12/2008 | Zhu et al. | |
| 2008/0320583 A1 | 12/2008 | Sharma et al. | |
| 2009/0064287 A1 | 3/2009 | Bagepall et al. | |
| 2009/0113517 A1 | 4/2009 | Engdahl et al. | |
| 2009/0164564 A1 | 6/2009 | Willis | |
| 2009/0235324 A1 | 9/2009 | Griffin et al. | |
| 2009/0241192 A1 | 9/2009 | Thomas | |
| 2009/0249076 A1 | 10/2009 | Reed et al. | |
| 2009/0249470 A1 | 10/2009 | Litvin et al. | |
| 2009/0320073 A1 | 12/2009 | Reisman | |
| 2009/0327908 A1* | 12/2009 | Hayton | 715/744 |
| 2010/0023601 A1* | 1/2010 | Lewin et al. | 709/218 |
| 2010/0024005 A1 | 1/2010 | Huang et al. | |
| 2010/0037304 A1 | 2/2010 | Canning et al. | |
| 2010/0071032 A1* | 3/2010 | Durham et al. | 726/2 |
| 2010/0107223 A1* | 4/2010 | Zheng | 726/3 |
| 2010/0138908 A1 | 6/2010 | Vennelakanti | |
| 2010/0332825 A1 | 12/2010 | Bradley et al. | |
| 2011/0138441 A1 | 6/2011 | Neystadt | |
| 2011/0138442 A1 | 6/2011 | Vinberg et al. | |
| 2011/0321130 A1 | 12/2011 | Tor | |
| 2012/0084850 A1 | 4/2012 | Novak | |

OTHER PUBLICATIONS

On securely enabling intermediary-based services and performance enhancements for wireless mobile users: http://74.125.155.132/scholar?q=cache:cqgALaog00kJ:scholar.google.com/&hl=en&as_sdt=2000 Retrieved Date: Apr. 15, 2010, 7 pages.

Managing mobile authentication methods: http://searchmobilecomputing.techtarget.com/feature/Managing-mobile-authentication-methods Published Date: Feb. 3, 2010.

Quynh, Nguyen Anh, et al, "Centralized Security Policy Support for Virtual Machine", Dec. 3-8, 2006, 10 pages.

Drake, Hannah, "Virtual Machine Security Enters the Mainstream", Mar. 16, 2009, 3 pages.

Microsoft TechNet, "Planning for Hyper-V Security", Sep. 2008, 3 pages.

U.S. Appl. No. 12/727,267, Office Action dated Jul. 10, 2012, 9 pages.

Haletky Edward L. , "VMware vSphere and Virtual Infrastructure Security: Securing the Virtual Environment" , Retrieved at<<http://www.informit.com/store/productaspx?isbn=0137158009>>, Jun. 22, 2009, 1 page.

Begoli Edmon, "Prototype Complex Enterprise Solutions with Just Your Workstation", Retrieved at<<http://www.devx.com/vmspecialreporUArticle/30382/1954>>, Jan. 30, 2006, 6 pages.

Garfinkel, et al. "When Virtual is Harder than Real: Security Challenges in Virtual Machine Based Computing Environments", Retrieved at<<http://www.stanford.edu/-talg/papers/HOTOS05/virtual-harder-hotos05.pdf >>, Published 2005, 6 pages.

Cowper Bruce, "Virtualization Security", Retrieved at<<http://www.infosecuritycanada.com/images/100358/2008_PDFs/Cowper_Virtualization_Security.pdf, 2008, 34 pages.

Reflex Security, "Security within a Virtualized Environment: A New Layer in Layered Security", Retrieved at <<http://www.vmware.com/files/pdf/partners/security/security-virtualized-whitepaper.pdf>> Oct. 6, 2009, 13 pages.

Vmware, "Securing the Cloud: A Review of Cloud Computing, Security Implications and Best Practices" Retrieved at <<http://www.savvis.neUen-US/Info_Center/Documents/Savvis_VMW_whitepaper_0809.pdf>> Oct. 6, 2009, 12 pages.

U.S. Appl. No. 12/633,805, Office Action mailed Jul. 10, 2012, 10 pages.

EnterpriseWAN Tips: http://searchenterprisewan.techtarget.com/tip/0,289483,sid200 gci1245936,00.html, Published Mar. 15, 2007, 5 pages.

Enterprise Remote Access: http://www.f5.com/pdf/white-papers/enterprise-remote-access-wp.pdf, Published Oct 19, 2007, 5 pages.

Why Replace Your IPSec for Remote Access: http://www.sonicwall.com/downloads/WP-ENG-035 Why-Replace-Your-IPSec US.pdf, 2009, Retrieved Date: Apr. 13, 2010, 10 pages.

"IPSec Authentication and Authorization Models": http://ptgmedia.pearsoncmg.com/images/158705II17/samplechapter/1587051117content.pdf, 2005, Retrieved Date: Apr. 13, 2010, pp. 89-107.

WISDOM Advanced Security Measures: http://www.wireless-center.net/Wi-Fi-Securitv/3129.html, Retrieved Date: Apr. 13, 2010, 6 pages.

OpenRG(TM) for Wireless Gateways and Access Points: http://www.krftech.com/openrg/datasheets/jungo_dsheet_wireless_ap.pdf, Retrieved Date: Apr. 13, 2010, 2 pages.

Core Clientless Web Access for SA 700-SA700-CORE: http://www.nscreensales.com/Core_Clientless_Web_Access_for_SA_700_p/sa700-core.html,—Retrieved Date: Apr. 13, 2010, 2 pages.

SSL VPN—An Introduction: http://www.google.co.in/search?hl=en&riz=1B3GGLL_enIN374IN374&g=ipsec+granular+authorization&start=30&sa=N, 2005, 2006, Retrieved Date: Apr. 13, 2010, 30 pages.

U.S. Appl. No. 12/822,724, Office Action dated Jul. 6, 2012, 18 pages.

Durfee, et al., "Posture-Based Data Protection," 2006, 20 pages.

Kuntze, et al., "Trusted Ticket Systems and Applications," retrieved Aug. 27, 2010, 17 pages, Fraunhofer Institut Sichere Informations-Technologie.

McCune, et al., "How Low Can You Go? Recommendations for Hardware-Supported Minimal TCB Code Execution," ©2008, retrieved Aug. 27, 2010, 12 pages, Carnegie Mellon University, University of North Carolina at Chapel Hill.

Schmidt, et al., "Trust for Location-based Authorisation," Dec. 13, 2007, 6 pages, Fraunhofer Institute for Secure Information Technology SIT; Nokia Siemens Networks GmbH & Co. KG.

Kuntze, et al. Trusted Ticket Systems and Applications, 2007, 14 pages.

U.S. Appl. No. 12/727,267, Amendment dated Nov. 9, 2012, 14 pages.

U.S. Appl. No. 12/727,267, Final Rejection dated Nov. 28, 2012, 9 pages.

U.S. Appl. No. 12/727,267, Amendment After Final Rejection dated Feb. 28, 2013, 14 pages.

U.S. Appl. No. 12/633,805, Amendment dated Nov. 6, 2012, 14 pages.

U.S. Appl. No. 12/633,805, Final Rejection dated Nov. 15, 2012, 11 pages.

U.S. Appl. No. 12/633,805, Amendment After Final Rejection dated Mar. 15, 2013, 15 pages.

(56) References Cited

OTHER PUBLICATIONS

U.S. Appl. No. 12/822,724, Amendment After Final Rejection dated May 16, 2013, 15 pages.
U.S. Appl. No. 12/822,724, Final Rejection dated Jan. 16, 2013, 15 pages.
U.S. Appl. No. 12/822,724, Amendment dated Oct. 9, 2012, 20 pages.
U.S. Appl. No. 12/822,724, Non-Final Rejection dated Jul. 6, 2012, 18 pages.
U.S. Appl. No. 13/015,202, Non-Final Office Action, mailed Dec. 21, 2012, 11 pages.
U.S. Appl. No. 13/015,202, Response to Non Final Office Action mailed Dec. 21, 2012, filed Mar. 21, 2013, 9 pages.
U.S. Appl. No. 13/015,202, Notice of Allowance mailed Jun. 3, 2013, 6 pages.
U.S. Appl. No. 12/727,267, Non Final Office Action mailed Dec. 24, 2013, 11 pages.
U.S. Appl. No. 12/633,805, Notice of Allowance mailed Dec. 26, 2013, 15 pages.
U.S. Appl. No. 12/727,267, Amendment dated Mar. 24, 2014, 15 pages.
U.S. Appl. No. 12/727,267, Notice of Allowance dated Apr. 2, 2014, 11 pages.
U.S. Appl. No. 12/822,724, Office Action dated May 7, 2014, 16 pages.
U.S. Appl. No. 12/822,724, Amendment dated Aug. 7, 2014, 18 pages.

* cited by examiner

TRUSTED INTERMEDIARY FOR NETWORK LAYER CLAIMS-ENABLED ACCESS CONTROL

BACKGROUND

Conventionally, access control decisions concerning whether a computer is granted access to a network are typically based at least in part on whether the computer meets certain system health requirements. In this respect, failure to keep computers that connect to a network up-to-date (e.g., equipped with the latest operating system updates, anti-virus signatures, etc.) is one of the most common ways that the integrity of the network may be jeopardized. For example, a computer that is not kept up-to-date may be vulnerable to malicious software which, when the computer connects to the network, can expose network resources to attacks and/or viruses. Thus, network administrators commonly specify minimum health requirements that a computer must satisfy to connect to a network. Enforcing these requirements can be difficult, especially given the number of different types of computers which request access, such as home computers, travelling laptops, etc., which are not under the administrator's direct control.

One product that assists administrators with ensuring that computers that access a network satisfy system health requirements is the Network Access Protection (NAP) product offered by Microsoft Corporation of Redmond, Wash. With NAP, administrators can define minimum health requirements that a computer must satisfy to connect, such as whether the computer has the most recent operating system updates installed, is equipped with the latest anti-virus signatures, has firewall software installed and enabled, etc. In a system that employs NAP, when a computer attempts to connect to the network, its health status is evaluated. Computers that comply with health requirements are granted access to the network, such as via the issuance of a certificate indicating compliance with those requirements, or using other techniques. Computers that do not comply are denied access, and may be subject to automatic remediation. For example, non-compliant computers may be automatically updated with missing software updates or configuration changes.

FIG. 1 is a block diagram depicting an example process whereby a computer attempts access to a network in a system employing NAP. In this process, computer 101 provides information relating to its health to health registration authority (HRA) 103 in act 105, which then passes that information to health policy server 104 in act 110. Health policy server 104 evaluates the information provided by computer 101 to determine whether it complies with system health policy. The results of this evaluation are then sent to HRA 103 in act 115. If computer 101 is compliant, in act 115 HRA 103 obtains a health certificate for computer 101 from health certificate issuing authority 106. The certificate is provided to HRA 103 in act 125, which then transfers it to computer 101 in act 130. Using the certificate, computer 101 may initiate protected communication with resource 102, and respond to communications initiated by other compliant computers (not shown in FIG. 1) which authenticate themselves using corresponding health certificates.

If computer 101 is not compliant with system health policy, health policy server 104 informs HRA 103 that access is to be denied, so that HRA 103 does not obtain a certificate for computer 101 from health certificate issuing authority 106. As a result, computer 101 cannot initiate communication with resource 102. Also included with the information provided by health policy server 104 to HRA 103 may be remediation instructions to be executed by computer 101, such as to communicate with a remediation server (not shown in FIG. 1) to obtain components necessary to bring computer 101 into compliance with system health policy.

Internet Protocol (IP) Security (IPsec) is a protocol suite used at the network layer of the Open Systems Interconnection (OSI) stack to secure communications that occur over a network in accordance with the IP protocol. A system that employs NAP and IPsec to secure network communications allows computers that comply with health requirements to connect with other computers on the network. Enforcement of NAP policy using IPsec confines communication to compliant computers after they have successfully connected and obtained a valid IP address configuration. In addition, a system that employs IPsec can control access to network resources (e.g., hosts, services, etc.) based on the identity of the device requesting access and/or its user.

SUMMARY

Applicant has appreciated that existing approaches to controlling access to network resources at the network layer are insufficiently flexible. For example, if a system employs a network layer security protocol (e.g., IPsec, SSL, another protocol, etc.) to enforce NAP policy, a computer requesting access to the network first reports its health to a health registration authority, or HRA, which passes the information to a health policy server that decides whether the computer complies with system health policy. If so, a certificate is issued which the computer uses in attempting a connection to a network resource in accordance with the network layer security protocol. If not, access is denied, and automatic remediation may occur. If the system employs a network layer security protocol but not to enforce NAP policy, then access decisions may be based on the identity of the device and/or its user. In either case, the decision on whether to grant the computer access is binary (yes/no) in nature, and is based primarily on the identity and/or health of the requesting device and/or its user, rather than on other information which may enable a more flexible approach to access control.

In some embodiments of the invention, additional flexibility is achieved with respect to access control decisions at the network layer through the use of information provided in claims, s. Claims may provide information in addition to or instead of that which is conventionally employed in making access decisions at the network layer (e.g., device identity and/or health and user identity). For example, claims may provide information on any of numerous attributes of the computer requesting access, the user on behalf of which the request is made, the one or more resources to which access is requested (e.g., IP addresses, ports, etc.), the circumstances surrounding the requested access (e.g., the location of the requesting computer, etc.), and/or other information. The information provided in the claims may be evaluated based on one or more access control policies, which may be pre-set or dynamically generated, and may be used in making a decision whether to grant or deny a computer access. Thus, more detailed information may be used in making access control decisions at the network layer, enabling greater flexibility in creating access control policies and in making access control decisions. As but one example, a computer that does not satisfy system health requirements (and thus may not be granted access by a conventional system employing NAP) may be granted limited access to the network (e.g., to only certain resources specified by a policy). Policies governing access control to any resource(s) may be flexibly formulated to take into account information of any nature or type, as embodiments of the invention are not limited in this respect.

Applicant has recognized that that providing a capability to base access control decisions at least in part on information in claims may require modifying network resources and/or applications residing thereon or accessible thereby to enable the receipt and processing of the information. To reduce or avoid the need for such modifications, some embodiments of the invention provide an intermediary configured to process the information in claims. The intermediary may be interposed (e.g., logically and/or physically) between a computer requesting access to a network resource and the resource itself, and may perform processing to enable making access control decisions based at least in part on claims information, so that the network resource need not be configured to do so. Upon completion of processing which results in a request to access a network resource being granted, the intermediary may forward information (e.g., the access request, a derivation thereof, and/or other information) to the resource, so that access by the computer may commence.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
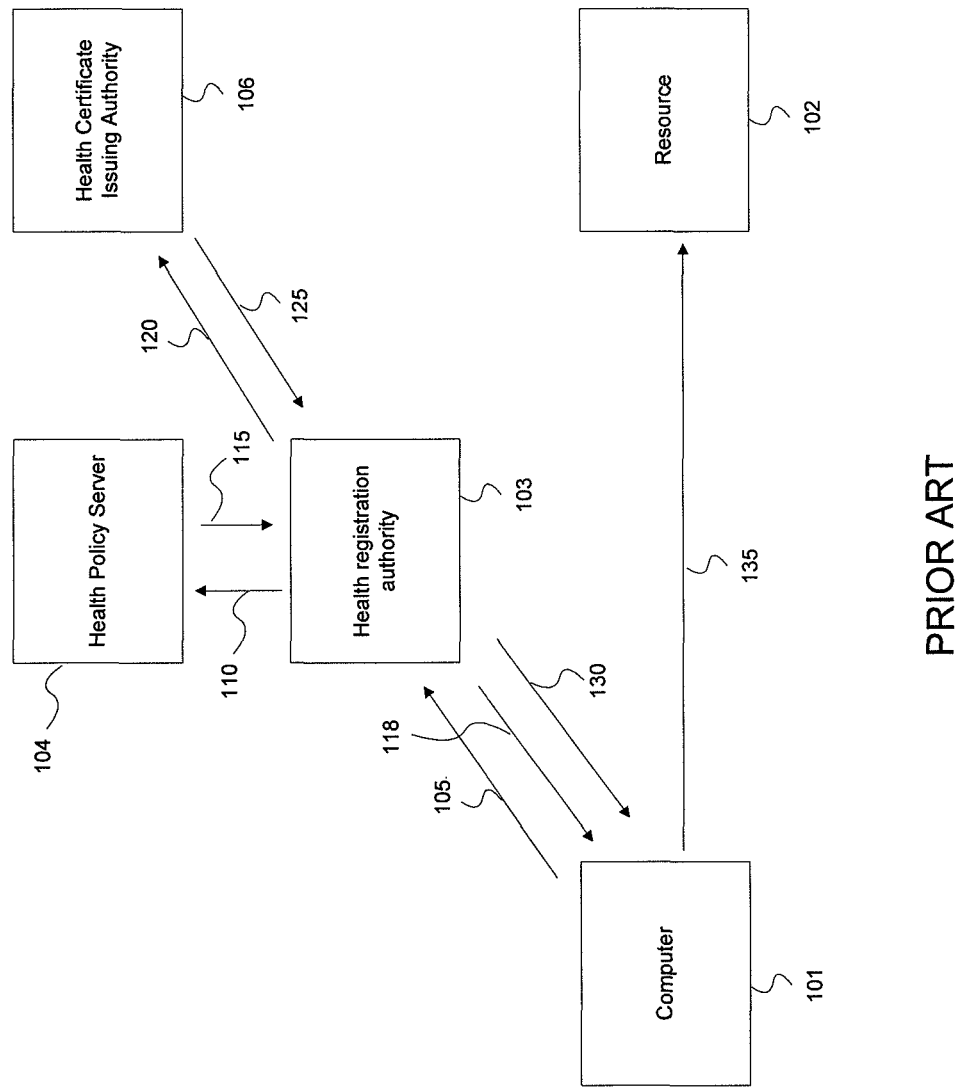
FIG. 1 is a block diagram depicting an example process by which a client requests access to a network resource, in accordance with the prior art.

Some embodiments of the invention provide an intermediary which facilitates more flexible decision-making with respect to access control at the network layer than conventional techniques allow, without requiring modifications to legacy components to process the information that enables this flexible decision-making to occur. In this respect, some embodiments employ claims, or "assertions," to achieve flexibility in network layer access control decision-making. An intermediary, which may be physically and/or logically interposed between a computer requesting access to a resource and the resource itself, may enable processing of information included in the claims, so that access control decisions to be based at least in part on the information, without requiring system components (e.g., the resource) to be configured to process the information.

In one example implementation, a request issued by a computer to access a network resource in accordance with a network layer security protocol (e.g., IPsec, Secure Sockets Layer (SSL), another network layer security protocol, etc.) may result in a request being issued by the computer for claims from one or more claims providers. These "requester claims" may describe any of numerous attributes of the computer, its user, the circumstances surrounding the access request, and/or other information. For example, the claims may identify the user's role, organizational affiliation, whether the computer is equipped with operational security software, whether it is a home or work computer, the geographic location from which the request is issued, the strength of the connection between the computer and the requested resource (e.g., whether encryption is used in addition to signing, encryption strength, etc.), and/or other information. Once obtained, the computer may send an access request to the intermediary which includes the requester claims. In this respect, the intermediary may simulate the resource to which access is requested, so that the computer "perceives" the access request as being sent to the resource.

The intermediary may request "resource claims" on behalf of the resource, from the same and/or different claims providers as those which provided the requester claims. The resource claims may describe various attributes of the resource, such as its business sensitivity, stage of deployment, organizational ownership, and/or other information.

Once resource claims have been obtained by the intermediary, they may be transferred with the requester claims to a policy decision point, which may evaluate information in the claims to determine whether they comply with one or more access policies. If the result of the evaluation is that the request complies with an access control policy, then access may be granted, and if not, then access to the resource may be denied. If access is granted, the intermediary may then forward the access request to the resource for processing. If the access request sent to the intermediary by the computer included the requester claims, then the intermediary may remove the requester claims before forwarding. The intermediary may perform additional processing (e.g., to translate the access request from a format that complies with one communication or security protocol to another, other processing, or a combination thereof). As a result of the processing performed by the intermediary, the resource need not be modified to process claims information to achieve the flexible access control decision-making that information provided in claims allows.

Figure 2:
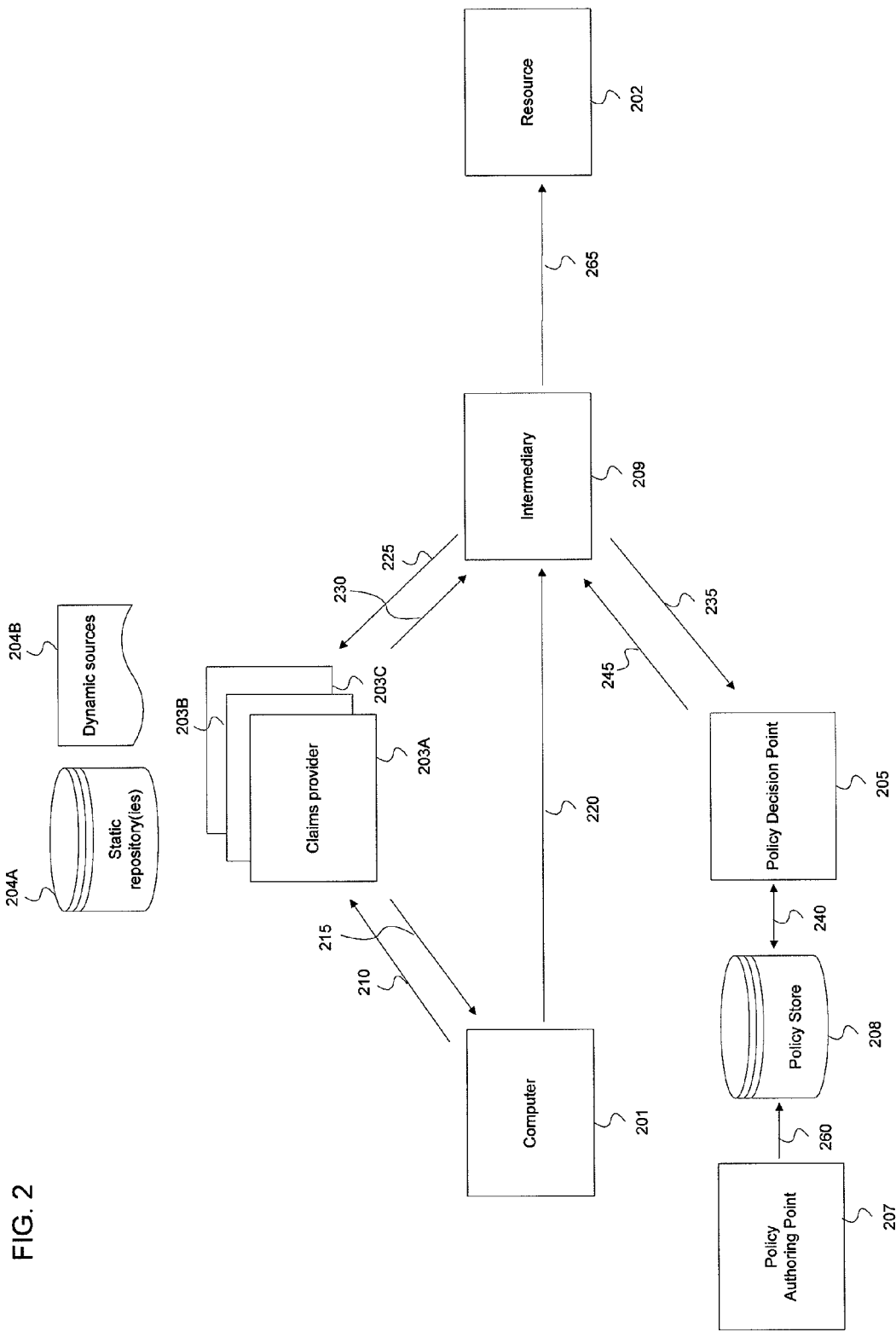
FIG. 2 is a block diagram depicting an example process employing claims whereby a client request to access to a network resource is processed using an intermediary, in accordance with embodiments of the invention.

FIG. 2 depicts an example process in which an intermediary is employed in greater detail. In the example process shown in FIG. 2, a request by computer 201 (e.g., initiated by an application executing thereon, some other component or process, or a combination thereof) to access resource 202 (e.g., a host, service, some other component or process, or a combination thereof) results in computer 201 issuing a request in act 210 for requester claims to one or more claim providers 203. In some embodiments, a transfer protocol (described further below) implemented on both computer 201 and resource 202 provides for computer 201 contacting claim providers 203 for requester claims.

In the example depicted, three claim providers are shown, labeled as claim providers 203A, 203B and 203C. However, it should be appreciated that any suitable number of claim providers may be employed, as the invention is not limited in this respect. For example, in some embodiments, multiple claim providers, each with a different system and/or organizational affiliation, may each provide a different type of claims. For example, one claim provider affiliated with a system that authenticates users may provide claims describing attributes of the user. Another claim provider affiliated with a system that verifies the health of computers requesting access may provide claims relating to system health. Another claim provider affiliated with a system that tracks the physical location of computers requesting access may provide claims relating to geographic location. Any suitable number of claim providers, and/or claim types, may be employed in the example system shown in FIG. 2, as embodiments of the invention are not limited to any particular implementation.

In addition, as shown in FIG. 2, each claim provider 203 may retrieve claims to be provided to computer 201 from a static claim repository 204A, a dynamic claim source 204B (e.g., one or more automated processes that generate(s) claims dynamically, one or more repositories on computer 201, resource 202, and/or another component, or some other dynamic claim source(s)), from both static and dynamic sources, or some other source(s). Embodiments of the invention are not limited to employing any particular source for claims or the information included therein.

In act 215, claim providers 203 provide one or more requester claims to computer 201. As noted briefly above, a claim may describe one or more attributes of computer 201, its user, the environment and context in which access is attempted, and/or other information. For example, a claim may include information relating to a user's identity, his/her role in an organization (e.g., a full-time employee, contractor, vendor, manager, etc.), organizational affiliation (e.g., sales department, finance, etc.), and/or any other information. Embodiments of the invention are not limited in the type of information that may be included in a claim.

If one or more requester claims include information relating to computer 201, that information may include any of information relating to the computer's health (e.g., whether the computer is equipped with security and/or anti-virus software, whether the software is activated, whether the computer employs an operational firewall, whether anti-virus signatures are up-to-date, etc.), the cryptographic strength of the connection between the device and the resource to which access is requested (e.g., whether signing and/or encrypted communications are used for communication, the type of encryption, etc.), an identifier for the computer, its role (e.g., a desktop computer, database server, web server, etc.), its organizational affiliation (e.g., operated by the sales department, finance department, etc.), and its owner (e.g., the company, an employee, a vendor, a public computer, etc.). Other information may be provided instead of, or in addition to, any or all of the items listed above.

If one or more requester claims include information relating to the computing environment and/or the access request, that information may include any one or more of the context in which access is attempted (e.g., from home, from work, from a branch office, while telecommunicating, etc.), and/or the user's physical geographic location (e.g., the country from which access is attempted). Other information may be provided instead of, or in addition to, the above. It should be appreciated that any suitable information may be provided in any number of requester claims, as the invention is not limited to any particular implementation.

In act 220, computer 201 includes the requester claims in an access request sent to intermediary 209. In some embodiments, intermediary 209 may simulate resource 202 so that computer 201 "perceives" the access request as being submitted to resource 202. This may be accomplished in any of numerous ways, and embodiments of the invention are not limited to any particular technique.

Intermediary 209 may be implemented in any of numerous ways. For example, intermediary 209 may be implemented as a process running on any one or more computers (e.g., the computer on which resource 202 resides, or one or more other computers), as a hardware appliance, virtual machine, in some other manner, or a combination thereof. Although intermediary 209 is depicted in FIG. 2 as being a single component, any suitable number of components may operate collectively as an intermediary and perform the functions described herein in accordance with embodiments of the invention. The invention is not limited to being implemented in any particular manner.

In act 225, intermediary 209 requests resource claims on behalf of resource 202 from claim providers 203A-203C. As described further below, the resource claims may describe various attributes of resource 202, rather than intermediary 209. In some embodiments, intermediary 209 is trusted by claim providers 203A-203C to be acting on behalf of resource 202.

It should be appreciated that intermediary 209 need not request resource claims in response to receiving requester claims from computer 201, as intermediary 209 may have previously obtained the resource claims, or some subset thereof, and may have them and/or the information included therein stored in a manner which facilitates quick retrieval (e.g., locally). Embodiments of the invention are not limited to any particular implementation.

Intermediary 209 need not obtain claims from the same claim providers as those from which computer 201 obtains claims. A system implemented in accordance with embodiments of the invention may include any suitable number of claims providers, each of which may provide claims to any one or more components or entities. The invention is not limited to any particular implementation.

In act 230 of the example process 200 shown, resource claims are provided to intermediary 209. Of course, embodiments of the invention are not limited to performing in the manner depicted in FIG. 2. For example, in some embodiments, resource claims may be provided to computer 201, which may submit them to intermediary 209. Embodiments of the invention are not limited to any particular manner of providing resource claims to intermediary 209.

In some embodiments of the invention, upon receiving the resource claims, intermediary 209 may perform processing to determine whether the resource claims are (or remain) valid. This determination may be based upon any of numerous criteria. If intermediary 209 determines based on this processing that the claims are invalid, then intermediary 209 may unilaterally deny computer 201 access to resource 202.

The resource claims provided to intermediary 209 in act 230 may, for example, describe various attributes of resource 202, such as the resource's identity, its role (e.g., a desktop computer, database server, web server, etc.), its organizational affiliation (e.g., operated by the sales department, finance department, etc.), its owner (e.g., the company, an employee, a vendor, a public computer), its stage of deployment (e.g., setup, staging, production, etc.), its sensitivity (e.g., high, medium or low business impact), and/or other information. Resource claims may include other information instead of, or in addition to, the items of information listed above, as the invention is not limited to being implemented in any particular manner.

In the example process depicted in FIG. 2, intermediary 209 provides the requester and resource claims to policy decision point 205 in act 235. However, it should be appreciated that not all embodiments of the invention are so limited, as any component(s) may provide the requester and resource claims to policy decision point 205. For example, computer 201 could provide the requester and resource claims to policy decision point 205, after receiving them from intermediary 209. Embodiments of the invention are not limited to any particular implementation.

It should also be appreciated that although policy decision point 205 is depicted in FIG. 2 in a manner which suggests it is implemented on a separate physical component than intermediary 209, embodiments of the invention are not so limited. Policy decision point 205 may be implemented on any one or more suitable physical components, such as the same computer(s) on which intermediary 209 reside(s), resource 202 reside(s), any other component(s) reside(s), or a combination thereof. Embodiments of the invention are not limited to being implemented in any particular manner.

Upon receiving the requester and resource claims, policy decision point 205 may evaluate the information provided in the claims with respect to one or more policies. In the example depicted, the one or more policies are retrieved from policy store 208 in act 240, which includes policies previously defined via policy authoring point 207 (symbolically defined in FIG. 2 as act 260; however, it should be appreciated that no temporal relationship or dependency exists between the specification of a policy and any other acts depicted in FIG. 2). Embodiments of the invention are not, however, limited to an implementation which includes retrieval when a request for an access control policy decision is received. For example, the policy(ies) or a subset thereof may have been previously retrieved, dynamically generated at the time of a request, or otherwise retrieved at a time other than when a policy decision is requested.

A policy may be defined in any suitable manner. In some embodiments of the invention, a policy may set forth criteria relating to access control decisions at any suitable level of granularity. For example, a policy may specify that access to [a host or service of particular sensitivity, such as "medium business impact"] at [a particular deployment stage, such as "production"] is to be granted when requested by a [user role, such as "vendor"] from [a location, such as "home"] using [a computer having a specified health indication, such as "having anti-virus software on"]. Of course, a policy need not set forth terms specifying that a grant of access is to occur if certain criteria are satisfied, as it may alternatively specify that access should be denied if certain criteria are satisfied, or that any suitable one or more actions is to occur or not occur if any one or more criteria are specified or not specified. A policy regarding access control decisions may be set forth in any suitable manner, and may employ any suitable information, at any suitable level of detail, provided in claims or otherwise, as the invention is not limited to any particular implementation.

In act 240, policy decision point 205 provides a policy decision to intermediary 209. For example, based on an evaluation of information included in the requester and/or resource claims, policy decision point 205 may provide an indication to intermediary 209 that access by computer 201 to resource 202 should be granted or denied.

If policy decision point 205 informs intermediary 209 that access to resource 202 should be granted to computer 201, then intermediary 209 may modify the request received in act 220 and forward the modified request to resource 202 in act 265. The request may be modified in any of numerous ways, such as to suit the capabilities of resource 202. For example, if resource 202 is not configured to or is otherwise incapable of processing claims information included in the request, then intermediary 209 may remove (e.g., extract) the claims information from the request before forwarding it to resource 202. Intermediary 209 may also, or alternatively, modify the protocol according to which the request is sent. For example, if the communication sent from computer 201 in act 220 complies with one protocol, and resource 202 is not configured to process information sent using that protocol, then intermediary 209 may translate the request to a protocol which resource 202 is capable of recognizing and processing. Any of numerous modifications may be performed by intermediary 209, as embodiments of the invention are not limited to any particular implementation.

Upon the completion of act 265, the process of FIG. 2 completes.

It should be appreciated that an ability to govern access control decisions using information other than the health level of a requesting computer may provide administrators with much more flexibility with respect to network layer access control decisions than conventional techniques afford, and therefore greater control over which access requests are granted. In this respect, while conventional network layer access control decisions are binary in nature, in that a decision to either grant or deny access is made solely on a requesting computer's health, embodiments of the invention enable making decisions using more information, which may be more detailed in nature, than is currently employed, providing greater decision-making latitude than current approaches afford.

In some embodiments, any or all of the transfers of information described above with reference to FIG. 2 may be performed in accordance with the IPsec protocol suite, and the IPsec protocol suite may govern the enforcement of access controls during authentication. For example, aspects of IPsec that govern how information is transmitted may be employed by components (e.g., computer 201, resource 202, and/or other components) to pass claims and other information, and aspects of the IPsec protocol suite that govern access control decision-making may be employed by any or all of these components to determine whether access is granted. As an example, computer 201 and intermediary 209 may request claims from one or more claims providers acting as a Security Token Service (STS) in accordance with IPsec. The computer may authenticate to an STS using its or its user's identity, and specify the "realm" in which it will use the claims, such as to connect with resource 202. An STS may issue the claims so that when the claims are passed to the policy decision point they may be verified. Claims may be embedded in a communication formatted in accordance with the IPsec protocol (as described further below) and sent to resource 202 so that an access control decision may be made.

Claims may be incorporated into a communication formatted to comply with IPsec in any of numerous ways, as the invention is not limited in this respect. In one example implementation, the certificate that is transferred from client to server in accordance with IPsec can be used to carry information from a requesting computer (e.g., computer 201, FIG. 2) to a resource (e.g., resource 202). For example, claims information may be included in a certificate, which may in turn be used to generate one or more artifacts that include the claims information. When the certificate and/or artifact(s) are received by the resource, the resource may extract the claims information, and provide the information to the policy decision point for an access control decision to be made.

In an example implementation, an extension of IPsec known as "AuthIP" may be employed to enable use of the Kerberos protocol, which is well-known to those skilled in the security and authentication arts. In this example implementation, claims information received from a claims provider may be used to generate a Kerberos ticket having the claims information embedded therein. For example, one or more fields may be embedded into a Kerberos ticket for each claim, and transferred from the requesting computer to the resource in accordance with IPsec.

In yet another example implementation, a new extension (e.g., an Internet Key Exchange (IKE) extension) may be created to allow claims information to be transferred in a manner different from those which are described above. Any suitable type of extension may be employed, as the invention is not limited in this respect.

It should be appreciated from the foregoing that any of numerous techniques may be employed to transfer and authenticate claims information in accordance with IPsec, including one or more techniques that are not described above. Embodiments of the invention are not limited to any particular implementation.

It should also be appreciated that although the example implementations described above employ IPsec or aspects thereof to transfer and authenticate claims information, embodiments of the invention are not so limited, as any one or more network layer security protocols may be employed. For example, embodiments of the invention may be implemented in a system that employs the Secure Sockets Layer (SSL) network layer security protocol, one or more other network layer security protocols, or a combination thereof.

Figure 3:
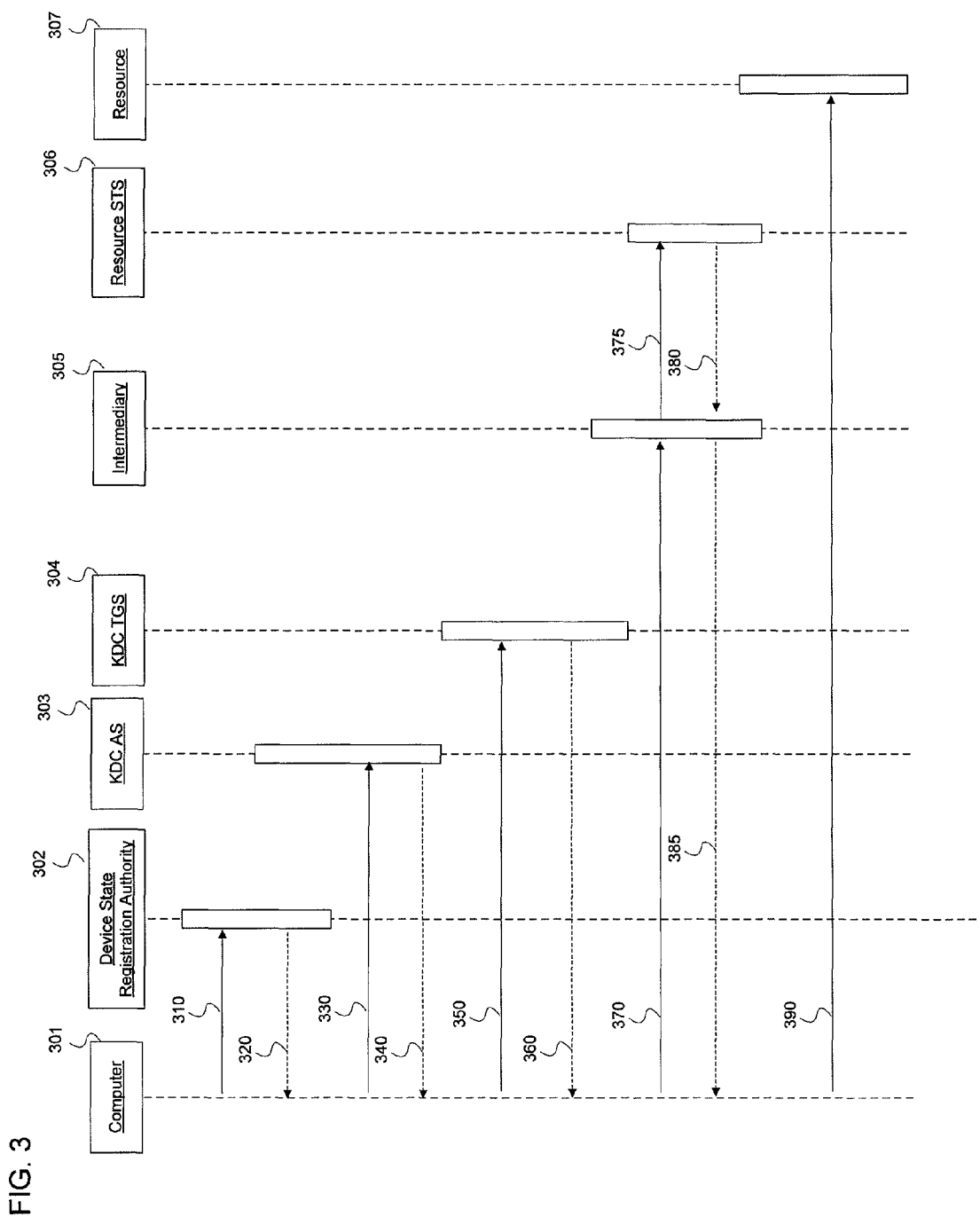
FIG. 3 is an activity diagram depicting an example process whereby a client's request to access a network resource is evaluated based on information included in claims, in accordance with embodiments of the invention.

FIG. 3 is an activity diagram that depicts the flow of information between various components in accordance with some embodiments of the invention which employ IPsec. In particular, FIG. 3 depicts information transferred between components in an implementation wherein the AuthIP extension of IPsec is used such that a Kerberos ticket is generated to include claims information based on information in a certificate passed from requesting computer. Once the Kerberos ticket is generated, it may be employed by the requesting computer to request access to a network resource. FIG. 3 shows information being communicated between computer 301, Device State Registration Authority 302, key distribution center (KDC) authorization service (AS) 303, KDC ticket granting service (TGS) 304, resource 305, resource STS 306, and target service 307.

At the start of the example process shown in FIG. 3, in act 310, computer 301 sends a device state assessment to Device State Registration Authority 302 (acting as claim provider). Device State Registration Authority 302 evaluates the device state assessment to determine whether computer 301 complies with policy. In the example depicted in FIG. 3, computer 301 complies with policy, such that Device State Registration Authority responds by providing a machine certificate that incorporates claims information to computer 301 in act 320.

In act 330, computer 301 seeks compound authentication, of itself and its user, by sending KDC AS 303 the machine certificate sent to it in act 320 and user credentials provided by the user to computer 301. In act 340, KDC AS 303 responds by sending a ticket granting ticket (TGT) to computer 301, which the computer then uses in a request for a Kerberos ticket that is sent to KDC TGS 304 in act 350. In act 360, KDC TGS 304 responds to the request with a Kerberos ticket which includes claims information. Claims information may be embedded in a Kerberos ticket in any suitable fashion, as embodiments of the invention are not limited in this respect.

In act 370, computer 301 sends the Kerberos ticket with the claims information it received in act 320, to intermediary 305, which extracts the embedded claims information and requests claims on behalf of resource 307 from resource STS 306 (acting as resource claims provider), in act 375. Resource STS 306 responds with resource claims in act 380, which intermediary 305 provides to a policy decision point to evaluate in light of one or more access control policies. An indication that the request complies with access control policy is provided to computer 301 in act 385. As such, computer 301 initiates access to target service 307 in act 390. The example process shown in FIG. 3 then completes.

It should be appreciated that the example processes depicted in FIGS. 2 and 3 may include acts other than those shown and described. For example, the example process described above with reference to FIG. 3 does not include the processing of claims describing how computer 301 connects to target service 307, but other embodiments of the invention may include such processing. Further, the order of the acts performed as part of these example processes may be different than the order illustrated and described. For example, other sequences of acts may be performed, certain acts may be performed in series or in parallel, as least partially, or other modifications to the example processes shown and described may be made. Embodiments of the invention are not limited to the particular implementation described herein.

Figure 4:
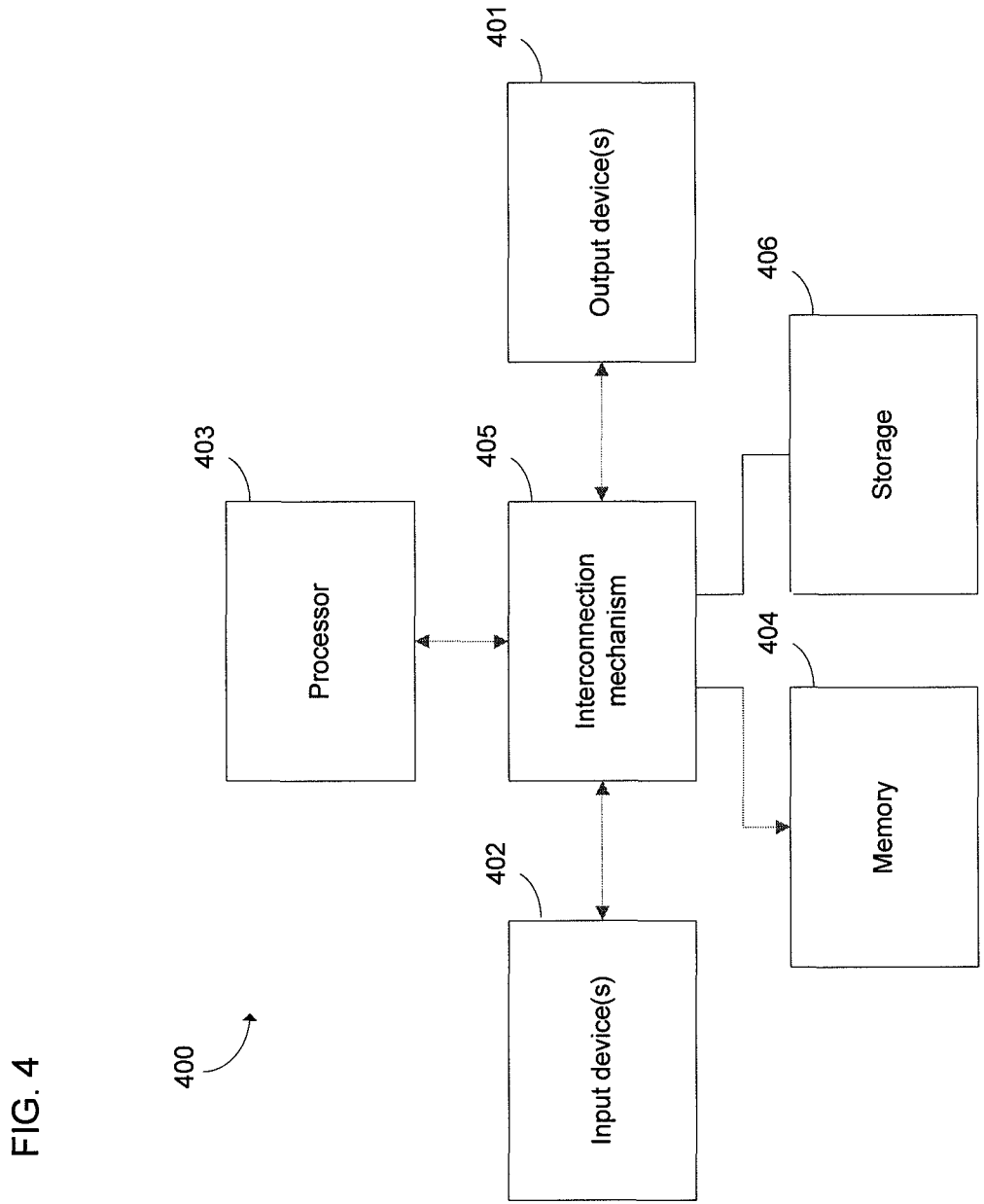
FIG. 4 is a block diagram depicting an example computer system on which some embodiments of the invention may be implemented.

Various aspects of the systems and methods for practicing features of the invention may be implemented on one or more computer systems, such as the exemplary computer system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses, switches, networks and/or any other suitable interconnection. The input device(s) 402 receive(s) input from a user or machine (e.g., a human operator), and the output device(s) 401 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 403 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Figure 5:
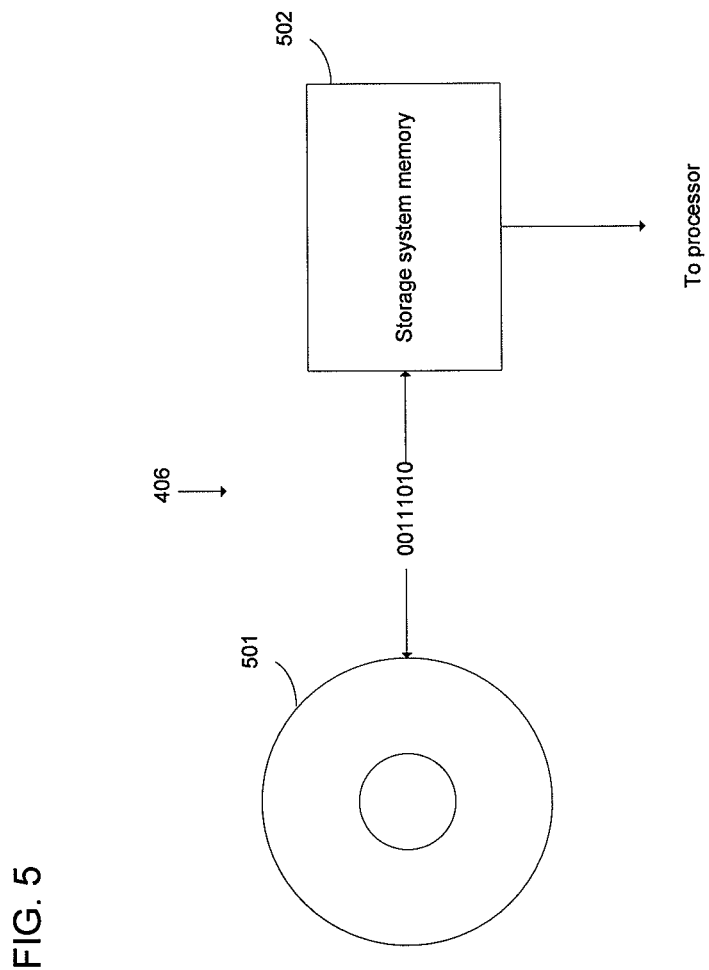
FIG. 5 is a block diagram depicting an example memory on which instructions embodying aspects of the present invention may be stored.

Processor 403 may also execute one or more computer programs to implement various functions. These computer programs may be written in any type of computer program language, including a procedural programming language, object-oriented programming language, macro language, or combination thereof. These computer programs may be stored in storage system 406. Storage system 406 may hold information on a volatile or non-volatile medium, and may be fixed or removable. Storage system 406 is shown in greater detail in FIG. 5.

Storage system 406 may include a tangible computer-readable and -writable non-volatile recording medium 501, on which signals are stored that define a computer program or information to be used by the program. The recording medium may, for example, be disk memory, flash memory, and/or any other article(s) of manufacture usable to record and store information. Typically, in operation, the processor 403 causes data to be read from the nonvolatile recording medium 501 into a volatile memory 502 (e.g., a random access memory, or RAM) that allows for faster access to the information by the processor 403 than does the medium 501. The memory 502 may be located in the storage system 406 or in memory system 404, shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited to any mechanism, whether now known or later developed. The invention is also not limited to a particular memory system 404 or storage system 406.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus for use in a system comprising a computer in communication via at least one network with a network resource, the at least one network employing a network layer security protocol, the apparatus comprising:
    at least one processor coupled to a memory, the at least one processor programmed to:
    (A) receive from the computer a request for access to the network resource and one or more requester claims describing attributes of one or more of the computer, a user of the computer, and a context in which access by the computer to the network resource is requested, the one or more requester claims being included in a communication formatted to comply with the network layer security protocol;
    (B) in response to receiving from the computer the request for access to the network resource, request from a claims provider, on behalf of the network resource, one or more resource claims, the one or more resource claims describing attributes of one or more of the network resource, an organization to which the network resource is affiliated, an owner of the network resource, a stage of deployment of the network resource, and a sensitivity of the network resource;
    (C) receive from the claims provider the one or more resource claims, the one or more resource claims being included in a communication formatted to comply with the network layer security protocol;
    (D) request an access control policy decision whether to grant or deny access by the computer to the network resource, the request providing information included in the one or more requester claims and the one or more resource claims, the request being included in a communication formatted to comply with the network layer security protocol, the access control policy decision being based at least in part on the information and an access control policy that is dynamically generated;
    (E) receive an access control policy decision indicating that access by the computer to the network resource is granted; and
    (F) removing the one or more requester claims from the request before sending the request to the network resource in accordance with a second protocol.

2. The apparatus of claim 1, wherein the at least one processor is further programmed to allow the apparatus to operate as a gateway between the computer and the network resource.

3. The apparatus of claim 1, wherein the system comprises a plurality of claim providers, (B) comprises requesting the one or more resource claims from one or more of the plurality of claim providers, and (C) comprises receiving the one or more resource claims from the one or more of the plurality of claim providers.

4. The apparatus of claim 1, wherein (A) comprises receiving the one or more requester claims embedded within a communication from the computer, and wherein the at least one processor is further programmed to extract the requester claims from the communication.

5. The apparatus of claim 1, wherein the apparatus comprises a computer, and wherein the network resource resides on the computer.

6. The apparatus of claim 1, wherein the access control policy decision is further based at least in part on an access control policy that is dynamically generated in response to receipt of the request for an access control policy decision.

7. The apparatus of claim 1, further comprising determining whether or not the one or more resource claims are valid.

8. A method for use in a system comprising a computer in communication via at least one network with a network resource, the at least one network employing a network layer security protocol, the method being performed in response to a request by the computer to access the network resource, the method comprising:
    (A) by a claims provider, receiving from the computer a request for one or more requester claims that describe attributes of one or more of the computer, a user of the computer, a context in which access by the computer to the network resource is requested, and a strength of connection between the computer and the network resource;
    (B) by the claims provider, providing the one or more requester claims to the computer, the one or more requester claims being included in a communication formatted to comply with the network layer security protocol, the one or more requested claims retrieved from a static claim repository and a dynamic claim store;
    (C) by the claims provider, receiving from an intermediary a request for one or more resource claims that describe attributes of one or more of the network resource, an organization to which the network resource is affiliated, an owner of the network resource, a stage of deployment of the network resource, and a sensitivity of the network resource, the request being sent on behalf of the network resource; and
    (D) by the claims provider, providing the one or more resource claims to the intermediary, the one or more resource claims being included in a communication formatted to comply with the network layer security protocol.

9. The method of claim 8, further comprising:
    (E) receiving a request for an access control policy decision, the request providing information included in the one or more requester claims and the one or more resource claims; and
    (F) issuing an access control policy decision based at least in part on the information received in (E) and an access control policy that is pre-set.

10. The method of claim 9, wherein (E) comprises receiving the request for the access control policy decision from the network resource.

11. The method of claim 8, wherein (A) comprises receiving the request at a plurality of claim providers.

12. The method of claim 11, wherein (C) comprises receiving the request for one or more resource claims at the same plurality of claim providers at which the request for one or more requester claims is received in (A).

13. The method of claim 8, wherein (A) comprises receiving the request from a client application executing on the computer.

14. The method of claim 8, wherein the network layer security protocol is IPsec.

15. At least one computer-readable storage memory having instructions recorded thereon which, when executed by a computer, perform a method of requesting an access control policy decision, the method comprising:
   receiving, from a claims provider, at least one claim comprising information related to the computer;
   responsive to receiving a request from the computer for access to a network resource, requesting at least one claim comprising information related to the network resource from the claims provider; and
   (A) responsive to receiving the request from the computer for access to the network resource, issuing a request for a decision whether to grant or deny access by the computer to the network resource, the request comprising the information relating to the computer that describes attributes of one or more of the computer, a user of the computer, and a context in which access by the computer to the network resource is requested, and, the information related to the network resource that describes attributes of one or more of the network resource, an organization with which the network resource is affiliated, an owner of the network resource, a stage of deployment of the network resource, and a sensitivity of the network resource, the information relating to the computer being included in a communication formatted to comply with the network layer security protocol, the information relating to the network resource being included in a communication formatted to comply with the network layer security protocol;
   (B) receiving a decision to grant access by the computer to the network resource; and
   (C) removing the at least one claim comprising information related to the computer from the request before sending the request for access to the network resource.

16. The at least one computer-readable storage memory of claim 15, wherein (A) comprises issuing, in response to receiving the at least one claim comprising the information related to the computer, a request that includes the at least one claim comprising the information related to the computer.

17. The at least one computer-readable storage memory of claim 15, further comprising instructions comprising determining whether or not the one or more resource claims are valid.

* * * * *